United States Patent Office 3,305,343
Patented Feb. 21, 1967

3,305,343
METAL PERXENATES AND METHOD OF
MAKING THE SAME
John G. Malm, 13 N. Wright St., Naperville, Ill. 60540,
and Evan H. Appelman, 4816 Cornell Ave., Downers
Grove, Ill. 60515
No Drawing. Filed Apr. 8, 1964, Ser. No. 358,411
22 Claims. (Cl. 23—346)

The present invention relates to a new chemical compound of xenon and the method of making the compound, and more particularly to the formation of metal perxenates.

The long-held concept has been that a group of rare gases among the 92 natural elements are chemically inert and will not combine with any other element. These gases are xenon, krypton, argon, neon, radon and helium. In the last year, however, a reaction was accomplished between xenon and fluorine to form xenon tetrafluoride having the formula $XeF_4$. Later, fluorine was also reacted with krypton and radon to form fluorides of these gases. The present invention relates to the discovery of stable perxenates formed from the fluoride compounds of xenon which will combine with the various well known metal ions.

An important object of the present invention is the provision of a stable metal perxenate compound containing octavalent xenon.

Another important object of the present invention is the provision of a metal perxenate which is a strong oxidizing agent due to xenon being in the octavalent state.

A further object of the present invention is the provision of a novel method of forming a stable perxenate compound by the hydrolysis of xenon hexafluoride ($XeF_6$) in the presence of a strong base, such as sodium hydroxide. A disproportionation reaction occurs and an insoluble salt, a metal perxenate precipitates from the solution. If sodium hydroxide is utilized, a sodium perxenate precipitates having the formula $Na_4XeO_6 \cdot xH_2O$.

The present invention further comprehends the provision of the formation of stable perxenates by the oxidation of basic solutions of hexavalent xenon, such as $XeO_3$, with ozone at room temperature.

The present invention also comprehends the provision of formation of less soluble perxenates by the addition of a metal cation to a solution of perxenate. Thus, a barium perxenate may be obtained by the addition of barium hydroxide to a water solution of sodium perxenate.

Additional objects and advantages of our invention should be apparent to those skilled in the art from the following description when considered with the specific examples illustrating the compound and method of formation.

Xenon, one of the "inert gases" has recently been found to actually combine with the very reactive gas fluorine to form a number of compounds. Now, it has been discovered that two of these remarkable compounds, xenon tetrafluoride ($XeF_4$) and xenon hexafluoride ($XeF_6$), are not entirely destroyed when they come in contact with water, as might have been expected, but instead react to give solutions of a new compound, xenon trioxide. These solutions have been found to be quite stable, although they are very powerful oxidizing agents. However, when the xenon trioxide is dried, it becomes highly unstable and may explode violently upon the slightest shock.

Each of the xenon fluorides hydrolyzes in a characteristic manner. Xenon difluoride, $XeF_2$, hydrolyzes to give xenon gas, oxygen and hydrogen fluoride.

$$XeF_2 + H_2O \rightarrow Xe + 2HF + \tfrac{1}{2}O_2$$

Xenon hexafluoride hydrolyzes in acidic or weakly basic solutions to give hydrogen fluoride and aqueous hexavalent xenon. Xenon tetrafluoride undergoes a rather complex hydrolysis giving off xenon gas and oxygen, and leaving some hexavalent xenon in solution.

$$3XeF_4 + 6H_2O \rightarrow 2Xe + 3O_2 + Xe(VI) + 12HF$$

Acid solutions of hexavalent xenon appear to be quite stable and behave as a strong oxidizing agent. It can oxidize hydrochloric acid to chlorine, manganous ion to permanganate, and iodine and bromine to iodate and bromate. Experiments indicate that in acid solution hexavalent xenon is present as a hydrated $XeO_3$ molecule. This molecule behaves as a very weak acid, being converted at a pH of 10.4 to an anion, presumably $HXeO_4^-$.

In a strong base, hexavalent xenon tends to be rather unstable and decomposes to xenon and oxygen. At the same time, however, it disproportionates to give octavalent xenon.

Both $XeF_4$ and $XeF_6$ hydrolyze in water to produce $XeO_3$ solutions. The $XeF_6$ is quantitatively converted to $XeO_3$, while with $XeF_4$, one-third of the compound is converted to $XeO_3$. If these solutions of $XeO_3$ are made basic with a strong base, such as sodium hydroxide, and allowed to stand, a disproportionation reaction takes place and white crystals of an insoluble salt precipitate out. Unlike xenon trioxide, these crystals are very stable and must be heated to high temperatures before they decompose.

These crystals were at first thought to be the sodium salt of xenon trioxide-sodium xenate; but careful analysis has shown that the compound contains xenon in a higher oxidation state and is a salt of xenon tetroxide-sodium perxenate having the formula $Na_4XeO_6 \cdot 8H_2O$. The perxenates are even stronger oxidizing agents than xenon trioxide, and they are only stable in the solid state or in a basic solution. In the presence of acid, they immediately evolve oxygen to leave xenon trioxide.

Alkaline solutions of perxenates contain double- and triply-charged negative ions and are yellow in color, whereas, alkaline solutions of xenon trioxide contain only singly charged negative ions. The following examples disclose the formation of various metal perxenates and the methods utilized in their formation.

*Example I*

A glass vessel containing 4.8 grams of $XeF_6$ is maintained close to liquid nitrogen temperature ($-195°$ C.) and approximately 80 cc. of water containing 18 grams of NaOH is slowly added. The mixture is warmed to room temperature, diluted with an equal volume of water, and allowed to stand for twelve hours. Insoluble sodium perxenate ($Na_4XeO_6 \cdot 8H_2O$) slowly precipitates from the solution, and this precipitate is separated by centrifuging, washed twice with water, and dried at room temperature in a stream of nitrogen. Approximately two grams of dry sodium perxenate are obtained. Upon drying in a vacuum dessicator, a sodium perxenate having the formula $Na_4XeO_6 \cdot 2H_2O$ is obtained.

*Example II*

To 60 cc. of 0.08 M $XeO_3$ solution is added 75 cc. of 0.2 M $Ba(OH)_2$. This reaction occurred at room temperature over a period of several minutes. The precipitate that was formed is filtered and washed with three 30 cc. portions of water. The product is dried in a stream of nitrogen for several hours, then crushed and dried under vacuum for 24 hours. 1.2 grams of barium perxenate is obtained with the formula $$Ba_2XeO_6 \cdot 1.5H_2O$$

Alkali metal perxenates may also be obtained by the oxidation of basic solutions of $XeO_3$ with ozone at room temperature. This process quantitatively converts XeO$_3$ to the alkali metal perxenates before it has time to disproportionate. The following example discloses this oxidation method to form sodium perxenate by the oxidation of XeO$_3$ in basic solution with ozone gas.

*Example III*

6.0 cc. of 50% NaOH solution is added to 92 cc. of 0.2 M XeO$_3$ solution. Oxygen gas containing 2–6% ozone is bubbled through the solution for six hours at room temperature. The product, sodium perxenate, precipitated from the solution as it was formed. The product was separated by centrifuging, washed twice with water and dried at room temperature in a stream of nitrogen. A yield of 7.7 grams of sodium perxenate octahydrate was obtained, the formula being $$Na_4XeO_6 \cdot 8H_2O$$

The method illustrated in Example III also permits the preparation in high yield of less soluble lithium perxenate and of solutions of the more soluble rubidium and cesium perxenates. However, where potassium hydroxide (KOH) was utilized, this method produces a mixed xenate-perxenate, having the formula $$K_4XeO_6 \cdot 2XeO_3$$

which also precipitates from solution as an insoluble salt.

Other metal perxenates can also be obtained by the addition of a metal cation, which forms a less soluble perxenate, to a solution of perxenate. In this manner, the addition of a solution of barium hydroxide to a water solution of sodium perxenate produces the solid compound Ba$_2$XeO$_6$ as shown in the following example.

*Example IV*

25 cc. of a 0.2 M Ba(OH)$_2$ solution in water is added to 100 cc. of a 0.02 M solution of sodium perxenate. The resulting precipitate is filtered and washed with three 30 cc. portions of water. The product was dried in a stream of nitrogen for several hours, then crushed and dried under vacuum for 24 hours. A yield of 1.0 gram of barium perxenate was obtained, with the formula Ba$_2$XeO$_6 \cdot 1.5H_2O$.

By the method of Example IV, the perxenates of Cu$^{+++}$, Ag$^{++}$, La$^{+++}$, Zn$^{++}$, Pb$^{++++}$, UO$_2^{++}$ and Th$^{++++}$ were precipitated by the addition of soluble salts of these cations to a water solution of sodium perxenate. The dehydrated perxenates can be obtained by heating to drive off water of crystallization or by drying in a vacuum dessicator.

The perxenates are the most powerful known oxidizing agents that can be obtained as pure solids. Their oxidizing power in acid solution is comparable to that of fluorine. Perxenates are completely stable as solids, moderately unstable in alkaline solution, and very unstable in acid solution from which they evolve oxygen rapidly and oxidize virtually anything that may be present.

The nature of perxenates can be shown by dissolving them in an iodide solution, then acidifying and measuring both the iodine and the xenon evolved. The reaction is Na$_4$XeO$_6$+8NaI+12HClO$_4$
→Xe+4I$_2$+12NaClO$_4$+6H$_2$O For routine analysis, use may be made of the fact that if acid is added first followed by the iodide, the reaction is altered to Na$_4$XeO$_6$+6NaI+10HClO$_4$
→Xe+½O$_2$+3I$_2$+10NaClO$_4$+5H$_2$O By comparing the amount of iodine evolved when acid is added first with that evolved when iodide is added first, the amount of perxenate present can easily be determined.

Perxenates can also be identified by observing their characteristic ultraviolet spectra in alkaline solution. The perxenate solutions have very distinct ultraviolet absorption spectra, with a peak between 220 and 270 millimicrons. The shape of the spectrum is a function of pH.

Generic sodium perxenate is a very stable salt, can be stored unchanged at room temperature and decomposes to yield xenon and oxygen only above 300° C. It was not observed to melt up to the temperature of decomposition. The solubility of sodium perxenate is shown in the following table:

TABLE I

| Solvent | Temperature | Solubility |
| --- | --- | --- |
| H$_2$O | 25° C | 7 gm./liter. |
| 0.1 M NaOH | 25° C | 1.2 gm./liter. |
| 0.5 M NaOH | 25° C | 0.2 gm./liter. |

The very low solubility of sodium perxenate in strong sodium hydroxide causes the salt to precipitate out of the medium in which it is generally formed (see Examples I and III). However, its solubility in water is sufficient to permit formation at room temperature of solutions containing approximately 25 millimoles per liter.

The solid sodium perxenate stored under 1 M NaOH or 5.6 M NaOH showed no loss of xenon over a fourteen day period, thus showing a high stability. When dissolved in water at a concentration of 0.02 M, xenon was lost at the rate of about 3.5 percent per day. Octavalent xenon salts decompose rapidly in acid, liberating oxygen and hexavalent xenon noted as Xe(VI).

The metal perxenates are very useful as powerful oxidizing agents in industrial chemical processes, as compact oxygen sources for rocket fuels, especially in the solid state, and in the formation of munitions and high explosives. One basic industrial process where the perxenates could be utilized would be in combining with sulfur dioxide to create sulfuric acid. Alkaline perxenate solutions are such powerful oxidizing agents that they will oxidize iodate to periodate, even though periodate is itself considered a very strong oxidizing agent. The standard oxidation potential of the perxenates containing octavalent xenon is estimated to be about 3.0 v. in acid and 0.9 v. in base. The following example illustrates the use of sodium perxenate in the microanalysis of manganese.

*Example V*

To 25 cc. of a solution 0.1 M in perchloric acid and containing 0.2 mg. of Mn$^{++}$, add 0.2 cc. of a saturated sodium perxenate solution (this solution contains about 1.7 mg. of Na$_4$XeO$_6 \cdot 2H_2O$). Mix and determine the permanganate colorimetrically. The solution will have an optical density of 0.35 at 525 millimicrons when measured in a cell of 1 cm. light path.

Having thus disclosed the invention, we claim:
1. An alkali metal perxenate.
2. The compound, sodium perxenate.
3. The compound, hydrated sodium perxenate having the formula Na$_4$XeO$_6 \cdot 8H_2O$.
4. The compound, barium perxenate.
5. The compound, copper perxenate.
6. The compound, silver perxenate.
7. The compound, lanthanum perxenate.
8. The compound, zinc perxenate.
9. The compound, lead perxenate.
10. The compound, uranium oxide perxenate.
11. The compound, thorium perxenate.
12. A method of forming a metal perxenate comprising reacting a solution of xenon trioxide with a metal hydroxide to form a precipitate of the metal perxenate.

13. A method of forming an alkali metal perxenate comprising adding a quantity of an alkali metal hydroxide to a solution of xenon trioxide to form a basic solution, and oxidizing the xenon trioxide by bubbling ozone gas through the basic solution with the alkali metal perxenate precipitating from the solution as it is formed.

14. A method of forming an alkali metal perxenate as set forth in claim 13, in which the oxidation reaction occurs at room temperature over a period of approximately six hours.

15. A method of forming a metal perxenate comprising dissolving sodium perxenate in water, adding to the solution the dissolved soluble salt of a metal cation which forms a less soluble perxenate, and collecting the precipitated metal perxenate.

16. An alkaline earth metal perxenate.

17. A method of forming a metal perxenate selected from the group consisting of alkali metal perxenates and alkaline earth metal perxenates comprising reacting xenon hexafluoride with a metal hydroxide selected from the group consisting of alkali metal hydroxides and alkaline earth metal hydroxides at a temperature of approximately $-195°$ C. and warming the solution to room temperature where the perxenate salt precipitates out of solution by gradual disproportionation.

18. The compound, potassium xenate-perxenate having the Formula $K_4XeO_6 \cdot 2XeO_3$.

19. The compound, lithium perxenate.

20. The compound, rubidium perxenate.

21. The compound, cesium perxenate.

22. A method of forming a metal perxenate selected from the group consisting of alkali metal perxenates and alkaline earth metal perxenates, comprising reacting a solution of xenon trioxide with a metal hydroxide selected from the group consisting of alkali metal hydroxides and alkaline earth metal hydroxides to form a precipitate of the metal perxenate by gradual disproportionation of the xenon trioxide.

References Cited by the Examiner

Hamilton et al.: "Geometry of the Perxenate Ion," Science, vol. 141, No. 3580, pp. 532–534, August 9, 1963.

Hyman, H. H.: Noble-Gas Compounds, The University of Chicago Press (1963), pp. 167–173.

CARL D. QUARFORTH, *Primary Examiner.*

BENJAMIN R. PADGETT, *Examiner.*

S. TRAUB, *Assistant Examiner.*